US007251876B2

(12) United States Patent
Rodriguez et al.

(10) Patent No.: US 7,251,876 B2
(45) Date of Patent: Aug. 7, 2007

(54) MULTIPLE WIRE FEED MACHINE AND PROCESS FOR TERMINATING ELECTRIC CABLE

(75) Inventors: Cesar Rodriguez, Rochester Hills, MI (US); Filiberto Heiras, Nuevo Laredo (MX)

(73) Assignee: Delphi Technologies, Inc., Troy, MI (US)

( * ) Notice: Subject to any disclaimer, the term of this patent is extended or adjusted under 35 U.S.C. 154(b) by 62 days.

(21) Appl. No.: 11/105,886

(22) Filed: Apr. 14, 2005

(65) Prior Publication Data

US 2006/0230597 A1 Oct. 19, 2006

(51) Int. Cl.
*B23P 23/00* (2006.01)
*B23Q 41/00* (2006.01)
*H01R 43/00* (2006.01)

(52) U.S. Cl. .................. 29/564.6; 29/33 M; 29/564.4; 81/9.51

(58) Field of Classification Search ............... 29/564.4, 29/564.6, 33 M, 867, 748; 81/9.4, 9.51, 81/9.41, 9.42, 9.43, 9.44
See application file for complete search history.

(56) References Cited

U.S. PATENT DOCUMENTS 3,626,431 A * 12/1971 Thierri et al. .............. 29/564.4
4,087,908 A * 5/1978 Fusco et al. ............... 29/564.4
4,164,808 A * 8/1979 Gudmestad et al. ....... 29/564.4
4,165,768 A * 8/1979 Gudmestad ................ 29/564.6
4,166,315 A * 9/1979 Gudmestad et al. ....... 29/564.4
4,175,316 A * 11/1979 Gudmestad ................ 29/564.4
4,194,281 A * 3/1980 Gudmestad ................ 29/564.4
4,476,629 A * 10/1984 Suzuki et al. ............. 29/564.4
4,554,725 A * 11/1985 Over et al. ................ 29/564.4
4,631,823 A * 12/1986 Collier et al. ............. 29/564.4
4,663,822 A * 5/1987 Blaha et al. ............... 29/564.4
4,713,880 A * 12/1987 Dusel et al. ............... 29/564.4
4,730,384 A * 3/1988 Frohlich .................... 29/564.4
5,490,316 A * 2/1996 Kimoto ...................... 29/564.4
5,781,990 A * 7/1998 Seidler et al. ............. 29/564.4
5,784,770 A * 7/1998 Long et al. ................ 29/564.4
5,842,266 A * 12/1998 Ishiwata .................... 29/564.4
6,279,215 B1 * 8/2001 Nomoto ..................... 29/33 M
6,910,256 B2 * 6/2005 Locher et al. ............ 29/564.4

* cited by examiner

*Primary Examiner*—Dana Ross
(74) *Attorney, Agent, or Firm*—David P. Wood

(57) ABSTRACT

A machine for terminating electric cable has a feeding segment that is decoupled from a terminating segment. The feeding segment has two feeders on which electric cable is wound. A length of cable is paid off one feeder and cut to length while another length of cable that has been paid off another feeder and cut to length is terminated at least at one end of the cable. A process for terminating electric cable provides a cable feed comprising a plurality of feeders and pays off a length of cable from one feeder of the cable feed while another length of cable that has been paid off another feeder of the cable feed is terminated at least at one end of the another length of cable. Alternatively lengths of cable are paid off two feeders and accumulated in a buffer segment associated with a feeding segment and a terminating segment. In an alternative process several lengths of cable are cut off and accumulated in a buffer while several other lengths of cable are being terminated.

2 Claims, 8 Drawing Sheets

MULTIPLE WIRE FEED MACHINE AND PROCESS FOR TERMINATING ELECTRIC CABLE

FIELD OF THE INVENTION

This invention relates to a machine and a process for terminating electric cable that is wound on a reel or drum.

BACKGROUND OF THE INVENTION

Electric cable is generally manufactured in very long lengths that are wound on a drum or reel for sale and/or transportation. For practical use, a length of electric cable is cut off the end of the electric cable that is wound on the drum and often another operation is performed at one or both ends of the cut-off length of cable. For high volume production in a factory, individual lengths of electric cable are processed in various ways in machines and processes that all involve paying off a length of electric cable from a drum or reel and cutting off the length of the paid-off cable for further processing. Further processing, such as stripping one or both ends of the cable, attaching a cable seal at one or both ends of the cable, and/or attaching a terminal at one or both ends of the cable, is generally referred to as terminating. Stripping, applying seals and applying terminals are only some of the many processing steps that can also be included in the terminating process.

The known machines and processes are generally of three types, a swing arm type, a transport arm type and a combination of a swing arm and a transport arm type. These known machines and processes comprise two segments, a feeding segment and a terminating segment with cutting off a length of paid off cable being the link between the two segments.

A problem with the known machines and processes of the above types is that the operation of the two segments are sequentially linked, so that one segment must wait to start its processing until the other segment has completed its operation. Consequently, one of the segments is idle a significant amount of time.

In such machines and processes, the cycle time that it takes from a finished electric cable to the next is the sum of the time each segment of the machine or process requires to process each part. Particularly the feeding time is directly proportional to the length of cable being processed, so that the problem increases with the length of electric cable that is to be paid off the reel.

SUMMARY OF THE INVENTION

This invention provides a machine and a process that pays off and cuts off lengths of cable from a cable that is wound on a drum or reel and then processes one or both ends of the lengths of cable that is faster than the machines and processes that are presently available.

In one aspect, the invention is embodied in a machine in which a feeding segment is decoupled from a terminating segment of the machine and comprises a plurality of cable feeders so that a length or several lengths of cable are paid off one or more reels of one or more cable feeders while the end or ends of another length of cable that has been paid off the reel of another cable feeder is being processed by the terminating segment of the machine.

In another aspect, the invention is embodied in a process characterized by eliminating a sequential link between a feeding segment and a terminating segment so that feeding segments and terminating segments can operate simultaneously, the feeding segment paying off cable while the terminating segment is terminating other paid off cable.

BRIEF DESCRIPTION OF THE DRAWINGS

FIGS. 1A to 1E are plan views of several electric cables that have been operated on;

DETAILED DESCRIPTION OF PREFERRED EMBODIMENTS

Figure 1A:
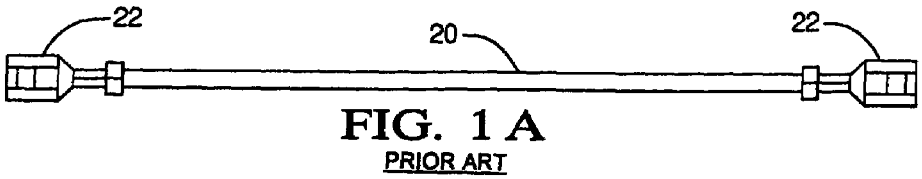
FIG. 1 A PRIOR ART
Figure 1B:
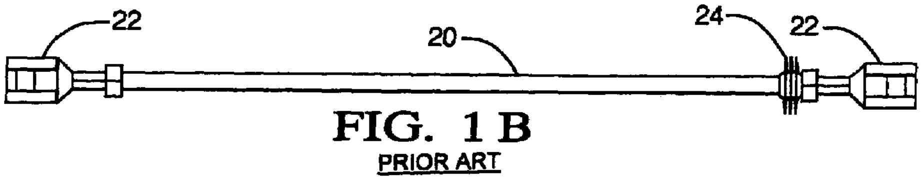
FIG. 1 B PRIOR ART
Figure 1C:
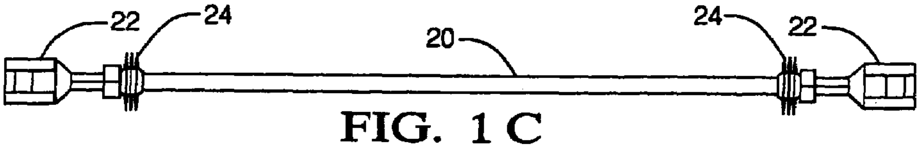
FIG. 1 C PRIOR ART
Figure 1D:
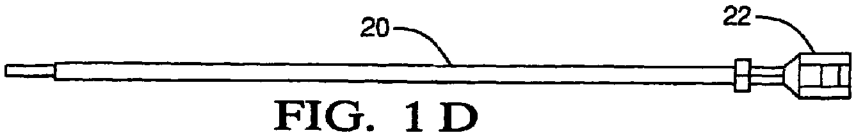
FIG. 1 D PRIOR ART
Figure 1E:
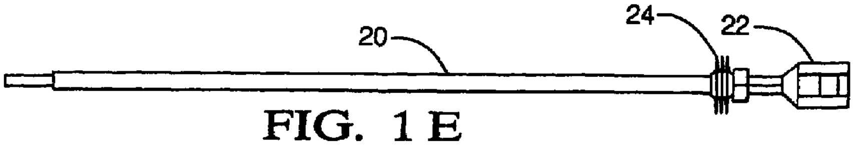
FIG. 1 E PRIOR ART

By way of background electric cables are terminated in various ways as shown in FIGS. 1A through 1E. These figures show an electric cable 20 terminated with a terminal 22 at each end (FIG. 1A); the electric cable 20 terminated with a terminal 22 at each end and a seal 24 at one end (FIG. 1B); the electric cable 20 terminated with a terminal 22 and a seal 24 at each end (FIG. 1C); the electric cable 20 terminated with a terminal 22 at one end and stripped at the other end (FIG. 1D); and the electric cable 20 terminated with a terminal 22 and seal 24 at one end and stripped at the other end (FIG. 1E).

In cases like FIGS. 1A, 1B, 1C, the terminal at one end can be the same or different from the terminal at the other end. This also applies to the seals in FIG. 1C.

As stated above, there are currently three types of machines for terminating electric cables such as the cables shown in FIGS. 1A through 1E.

Figure 2:
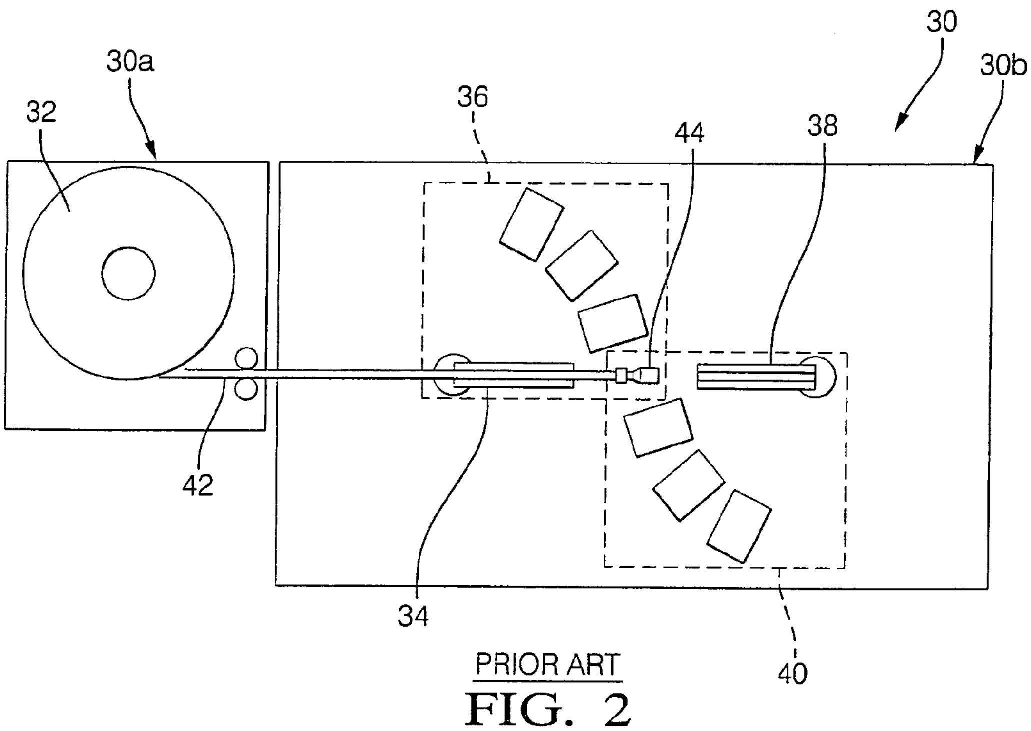
PRIOR ART FIG. 2
FIG. 2 is a schematic top view of a prior art swing arm type machine showing a process step for terminating electric cable.
Figure 3:
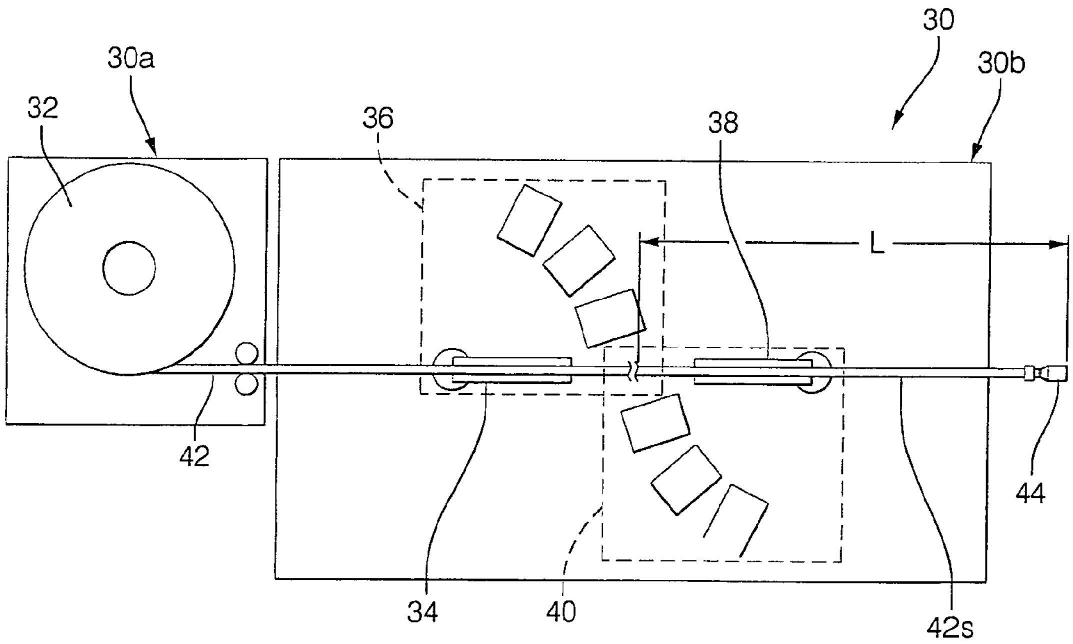
PRIOR ART FIG. 3
FIG. 3 is a schematic top view of the prior art machine of FIG. 2 showing a further process step for terminating the electric cable.
Figure 4:
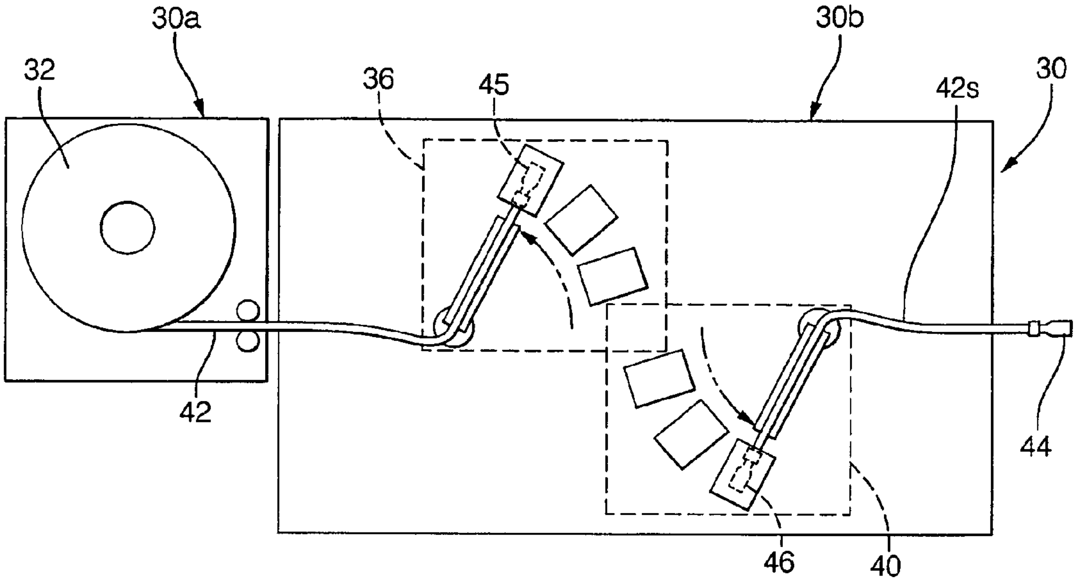
PRIOR ART FIG. 4
FIG. 4 is a schematic top view of the prior art machine of FIG. 2 showing a still further process step for terminating the electric cable.
Figure 5:
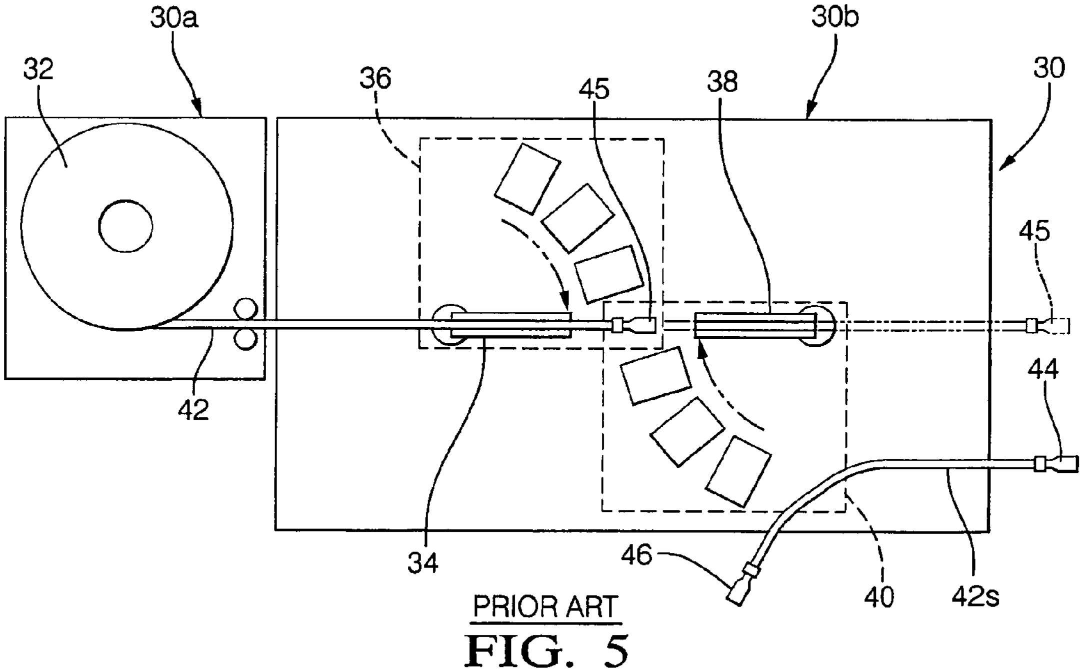
PRIOR ART FIG. 5
FIG. 5 is a schematic top view of the prior art machine of FIG. 2 showing still further processing steps for terminating the electric cable.

FIG. 2 is a schematic illustration of a prior art "swing arm" machine 30 for terminating electric cables, such as the cable shown in FIG. 1A, comprising a feeding segment 30*a* having a cable feeder 32, and a terminating segment 30*b* having a first or leading end swing arm 34 in a first processing area 36 and a second or trailing end swing arm 38 in a second processing area 40. In order to start the process, electric cable 42 is initially paid off the reel of cable feeder 32 and fed to the leading end swing arm 34 and the first processing area 36 where the leading end of cable 42 is stripped and terminated as indicated at 44. Cable 42 is then fed to second processing area 40 to establish the length L of the cable 42*s* as shown in FIG. 3. Cable 42 is then cut between the first and second swing arms 34 and 38 as also shown in FIG. 3. Swing arm 34 then swings the new leading end of cable 42 through the first processing area 36 terminating the new leading end of cable 42 as indicated at 45 in FIG. 4 while swing arm 38 simultaneously swings the trailing portion of the severed cable 42*s* through processing area 40 terminating the trailing end of severed cable 42*s* as indicated at 46. The severed cable 42*s* is now finished and removed and both swing arms 34 and 38 are returned to their starting positions as shown in FIG. 5. Cable 42 with terminal 45 is then fed to the second processing area 40 as shown in phantom in FIG. 5 and the process is repeated producing a finished cable in each cycle.

While the operation has been described in connection with the cable shown in FIG. 1A, any of the cables shown in FIGS. 1A through 1E can be produced by providing the proper tooling in the respective processing areas 36 and 40. For instance, both processing areas could include a first station to strip the end of the cable, a second station to insert a seal on the stripped end of the cable and a third station to crimp a terminal on the stripped end of the cable to produce the cable shown in FIG. 1C.

Figure 6:
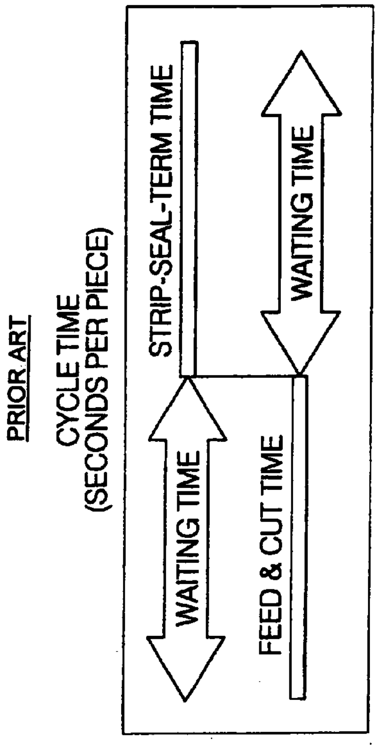
FIG. 6 is a chart.

FIG. 6 is a representative graph showing the typical cycle time of a prior art swing arm type termination machine such as the machine 30 that is illustrated schematically in FIGS. 2 through 5. This chart illustrates that the feed and cut time is generally as long as or longer than the time that it takes to strip an end of the electric cable and attach a seal and a terminal to the stripped end even when two ends are being terminated in processing areas 36 and 40 simultaneously. The processing time is fixed while the feeding time is directly proportional to the length of the cable being processed.

Figure 7:
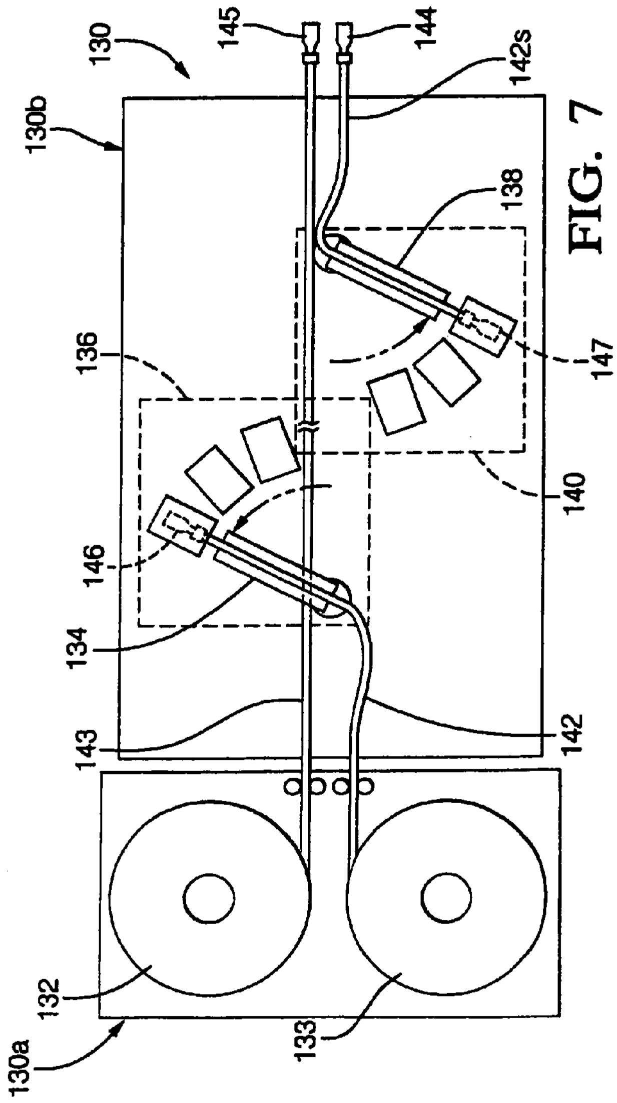
FIG. 7 is a schematic top view of a swing arm type machine of the invention for terminating electric cable.

A first embodiment of the invention is shown schematically in FIG. 7. In this first embodiment, the feeding segment is decoupled from the terminating segment. Thus a "swing arm" machine 130 of the invention for terminating electric cables, such as the cable shown in FIG. 1A, comprises a feeding segment 130*a* that is decoupled from a terminating segment 130*b*. Feeding segment 130*a* has a first cable feeder 132 and a second cable feeder 133. Terminating segment 130*b* comprises a first or leading end swing arm 134 in a first processing area 136 and a second or trailing end swing arm 138 in a second processing area 140. In order to start the process of the invention, electric cables 142 and 143 are initially paid off cable feeders 133 and 132 separately and fed to the first processing area 136 where the leading end of cables 142 and 143 are stripped and terminated as indicated at 144 and 145 respectively. However the ends of cables 142 and 143 are still in processing area 136.

Cable 142 is then fed to the second processing area 140. Cable 142 is then cut between the first and second swing arms 134 and 138. Cable 143 remains with terminal 145 still in processing area 136. Cables 142 and 143 are now ready for regular processing.

Figure 8:
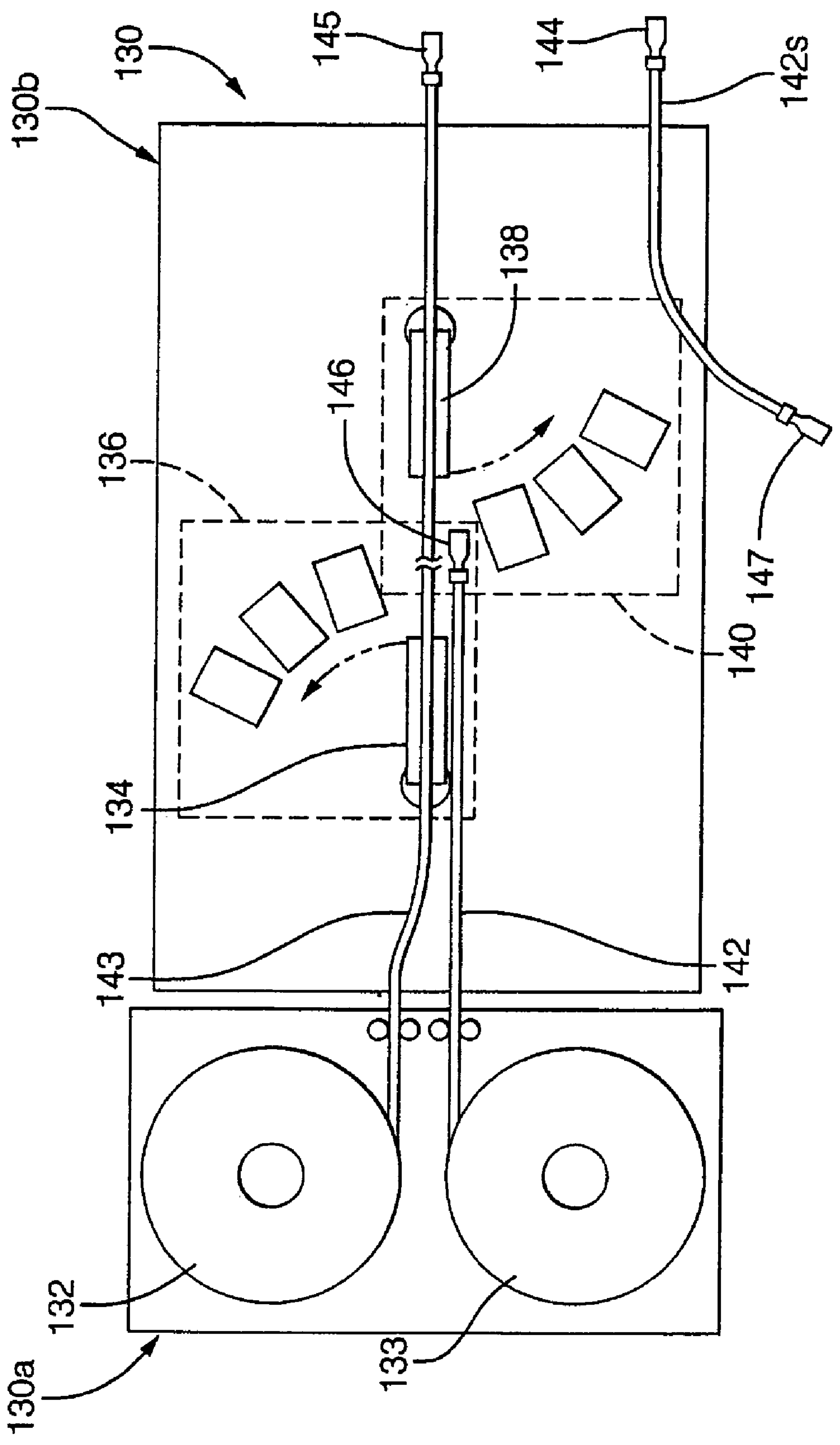
FIG. 8 is a schematic top view of the swing arm machine of FIG. 7 showing a further processing step for terminating the electric cable.

Swing arm 134 then swings the new leading end of cable 142 through the first processing area 136 terminating the new leading end of cable 142 as indicated at 146 in FIG. 7 while swing arm 138 simultaneously swings the trailing portion of the severed cable 142*s* through processing area 140 terminating the trailing end of severed cable 142*s* as indicated at 147. The severed cable 142*s* is now finished and removed and both swing arms 134 and 138 are returned to their starting positions as shown in FIG. 8.

In the meantime, cable 143 is fed to processing area 140 while cables 142 and 142*s* are terminated. Cable 143 is cut between swing arms 134 and 138 either while cables 142 and 142*s* are being terminated or after swing arms 134 and 138 are returned. Cables 143 and 143*s* are then terminated while cable 142 is fed to processing area 140. The above steps are repeated with cable 142 on feeder 133 being fed to processing area 140 while cable 143 is being processed in processing areas 136 and 140 after which cable 143 on feeder 132 is fed to processing area 140 while cable 142 is processed in processing areas 136 and 140 by swing arms 134 and 138.

Figure 9:
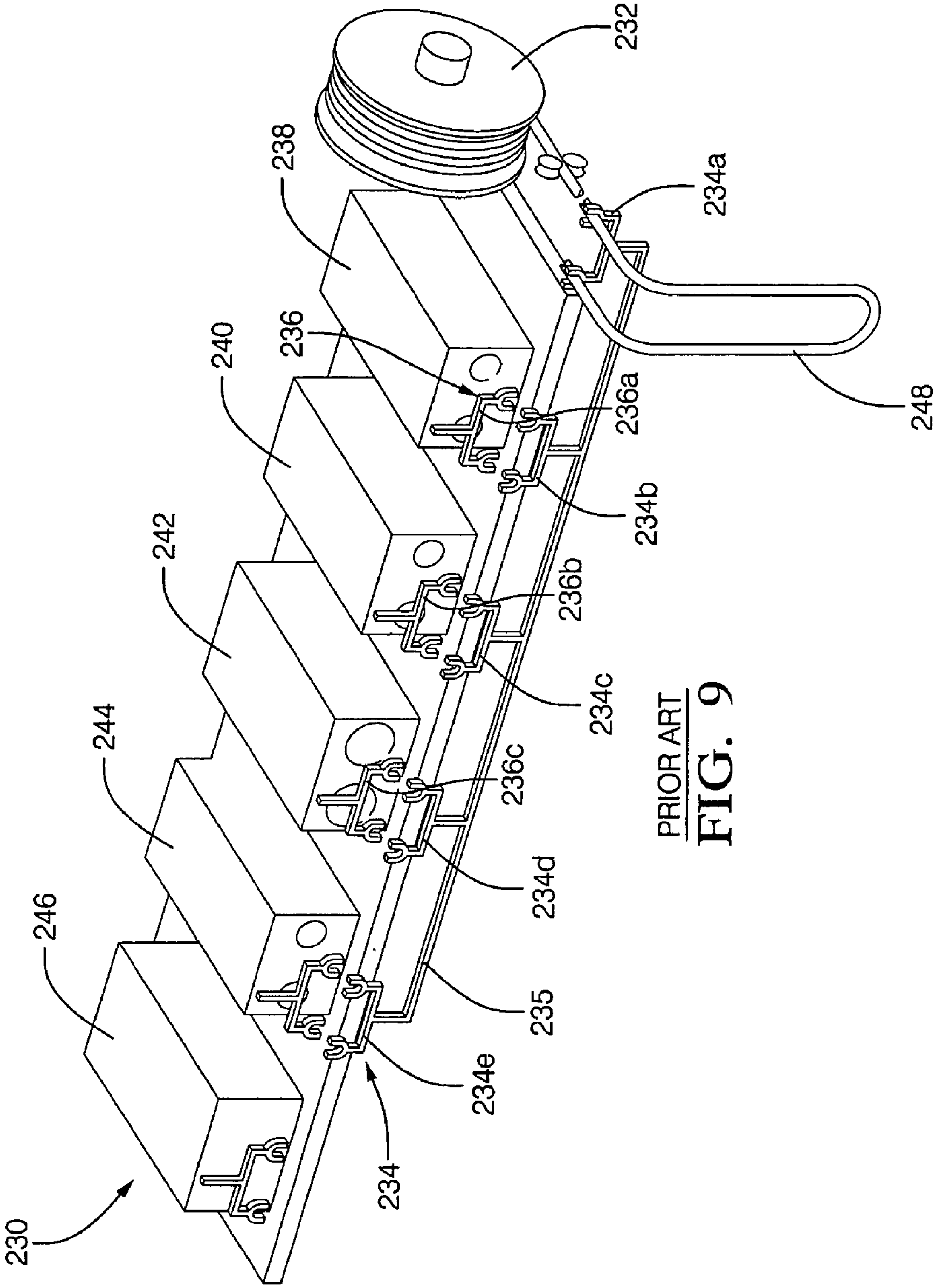
PRIOR ART FIG. 9
FIG. 9 is a schematic perspective view of a prior art transport arm type machine showing a process step for terminating electric cable.
Figure 10:
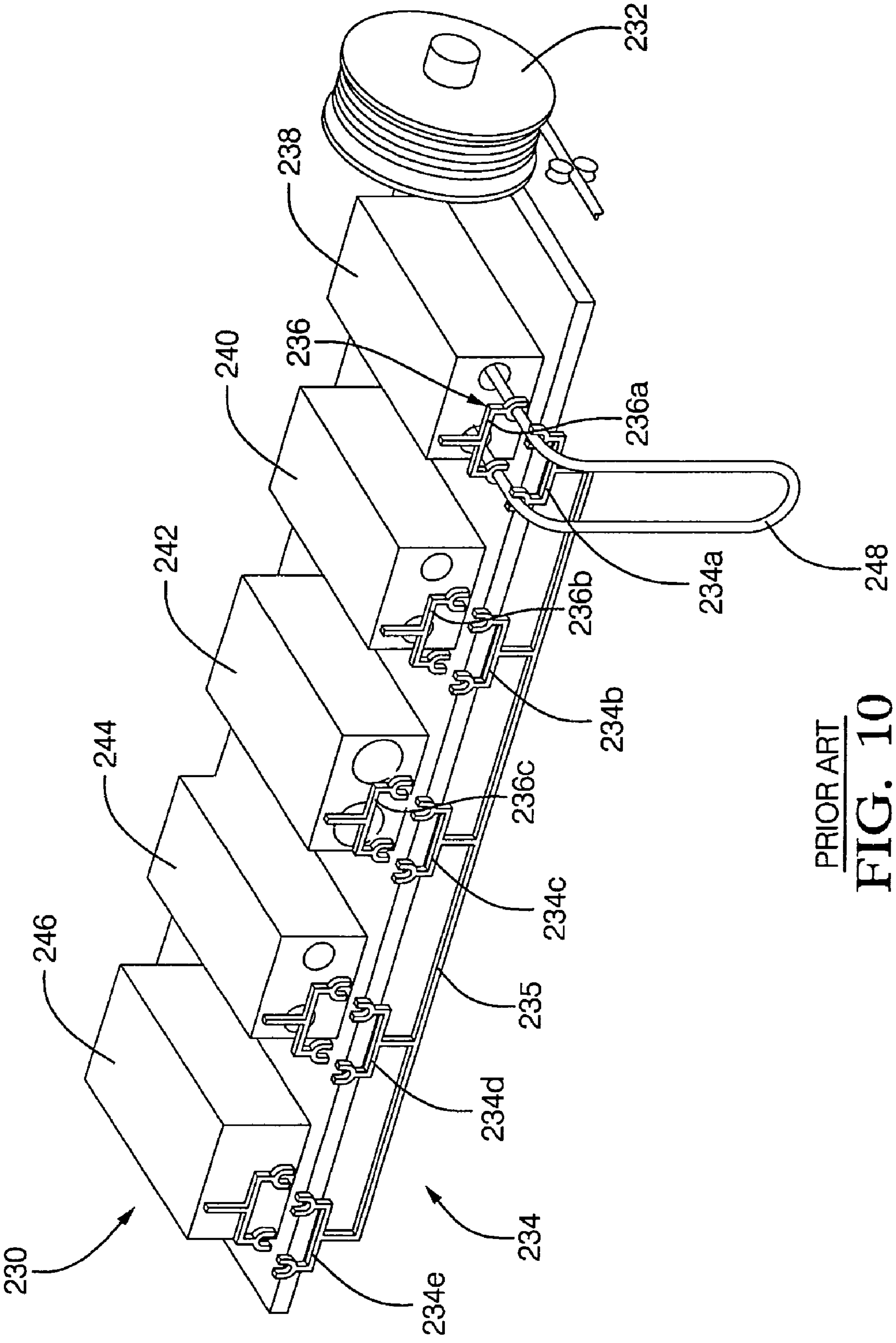
PRIOR ART FIG. 10
FIG. 10 is a schematic perspective view of the prior art machine of FIG. 9 showing a further process step for terminating the electric cable.

FIGS. 9 and 10 are schematic perspective views of a prior art "transport arm" machine 230 for terminating electric cables, such as the cable shown in FIG. 1C, comprising a cable feeder 232, a set of movable dual transport arms 234 comprising spaced transport arms 234*a*, 234*b*, 234*c*, etc. attached to slide bar 235, a set of movable dual processing arms 236 comprising spaced processing arms 236*a*, 236*b*, 236*c*, etc., that travel in and out at fixed locations and a plurality of sequential processing areas 238, 240, 242, 244 and 246 at the fixed locations. The dual transport arms 234 reciprocated back and forth with slide bar 235 from the load position shown in FIG. 9 to a discharge position shown in FIG. 10 where arms 234*a* are aligned with processing area 238 and arms 234*e* are in a discharge processing area 246. Alternatively transport arms 234*a*, 234*b*, 234*c*, etc. could be moved by individual motor (not shown) in a coordinated fashion.

In order to start the process, a length of electric cable 248 is paid off wire feeder 232, fed to dual transport arms 234*a* and cut with dual transport arms 234*a* holding the ends of the electric cable 248 in a looped or generally U-shaped orientation in a well known manner as shown in FIG. 9. Slide bar 235 then moves to the left as shown in FIG. 10 so that transport arms 234*a* transport cable 248 to processing area 238 where cable 248 is transferred to dual processing arms 236*a* which take cable 248 into the processing area 238 to strip the ends of cable 248 as shown in FIG. 10. In the meantime, slide bar 235 returns to the load position and another length of electric cable is cut-off and held by dual transport arms 234*a*. After stripping, processing arms 236*a* deliver cable 248 to transport arms 234*b*. On the next stroke transport arms 234*b* take cable 248 to the next processing area 240 and to dual processing arms 236*b* while transport arms 234*a* take the second length of electric cable to the processing arms 236*a* and into the processing area 238. Eventually several lengths of cable are being cut and processed simultaneously, that is a length of cable is being paid off feeder 232 cut and held by transport arms while another length of cable is being processed at area 238, while another length of cable is being processed at area 240, etc. While this "transport arm" type of prior art machine and process may be quicker in the processing section, than the prior art "swing arm" type discussed above. However, the feeding section still takes an inordinate amount of time to pay off hold and cut a length of cable from feeder 232 for further processing.

Figure 11:
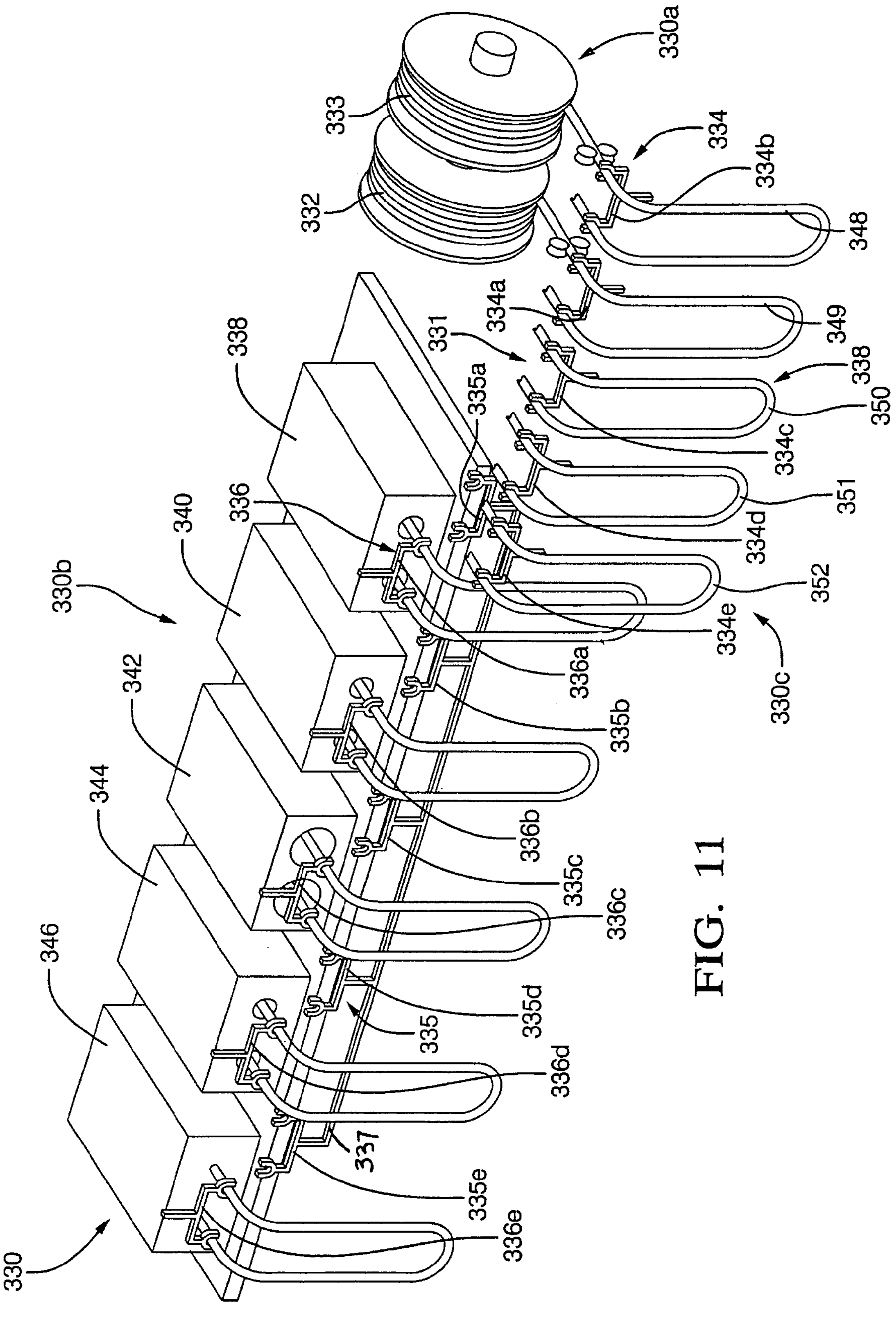
FIG. 11 is a schematic perspective view of a transport arm type machine of the invention showing a step in another process of this invention for terminating the electric cable.

FIG. 11 shows a second embodiment of the invention applied to a "transport arm" type of machine and process. In this second embodiment, a "transport arm" machine 330 for terminating electric cables, such as the cable shown in FIG. 1C, has a feeding segment 330*a* that is decoupled from a terminating segment 330*b* with a buffer segment 330*c* interposed between the feeding segment 330*a* and the terminating segment 330*b*. Feeding segment 330*a* comprises a plurality of cable feeders, two of which are illustrated as a first cable feeder 332 and a second cable feeder 333, it being understood that more cable feeders can be utilized.

A first set of movable, recirculating, dual transport arms 334 comprising spaced transport arms 334*a*, 334*b*, 334*c*, etc., are associated with feeding segment 330*a* and buffer segment 330*c*. Lengths of electric cable are continuously paid off the reels of cable feeders 332 and 333, held by dual transport arms in a looped or generally U-shaped orientation, for example by dual transport arms 334*a* and 334*b* and cut-off as shown by cables 348 and 349 in FIG. 11. Transport arms 334*a* and 334*b* holding cables 348 and 349 move to buffer segment 330*c* where more dual transport arms holding cut-off cables are accumulated as indicated by cables 350, 351 and 352 held by transport arms 334*c*, 334*d* and 334*e*. Then two other dual transport arms arrive and align with the reels of cables feeders 332 and 333 for cutting off new lengths of cable from the reels of cable feeders 332 and 333. As indicated in the above case, recirculating dual transport arms 334 recirculate or travel in a closed path or loop in well known manner and only a portion of the loop has been shown for clarity.

A second set of movable, dual transport arms 335 comprising spaced transport arms 335*a*, 335*b*, 335*c*, etc, attached to a slide bar 337 are associated with buffer segment 330*c* and terminating segment 330*b* to pick-up the lengths of cut-off electric cables in buffer segment 330*c* and deliver the cut-off electric cables to terminating segment 330*b*. For example, cable 352 held by dual transport arms 334*e* in buffer segment 330*c* is picked up by dual transport arms 335*a* which would then deliver cable 352 to terminating segment 330*b* which has a plurality of sequential processing areas 338, 340, 342, 344 and 346 at fixed locations. The dual transport arms 335 attached to slide bar 337 operate in the same manner as dual transport arms 234 attached to slide bar 235 except that the lengths of cable are picked up from one of the dual transport arms 334 in buffer segment 330*c*.

A third set of dual processing arms 336 comprising spaced processing arms 336*a*, 336*b*, 336*c*, etc. that move in and out at fixed locations are associated with respective ones of the sequential processing areas 338, 340, 342, 344 and 346. The dual transport arms, 335*a*, 335*b*, 335*c*, etc. deliver cut-off cables to the processing areas 338, 340, 342, 344 and 346 sequentially. At each processing area, one of the dual processing arms 336*a*, 336*b*, 336*c* etc., picks up a cut-off cable from one of the dual transport arms 335*a*, 335*b*, 336*c*, etc., moves it into its associated processing area for processing and returns the processed cable back to one of the dual transport arms for delivery to the next processing area. For instance, dual processing arm 336*a* would pick up cable 352 from dual transport arm 335*a* (when it is aligned with processing area 338) to take cable 352 into processing area 338 for processing and then bring cable 352 back to dual transport arm 335*b* which would then take cable 352 to processing area 340 where dual processing arm 336*b* would take cable 352 for further processing. Eventually cables are simultaneously being processed at all of the processing areas 338, 340, 342, etc. It should be understood that the number of processing areas shown in illustrative only and that a particular machine or process of the invention could have fewer or more than the number of processing areas shown.

In this second embodiment, cycle time is reduced by decoupling the feeding segment 330*a* (where cable lengths that are continuously being cut from a plurality of cable feeders 332 and 333) from the terminating segment 330*b* and interposing a buffer segment 330*c* between the feeding segment 330*a* and the terminating segment 330*b* where the cut-off cable lengths are stored so that there is always a cut-off cable length ready for processing in the terminating segment of the machine or process.

The exemplary embodiments shown and described above are provided merely by way of example and are not intended to limit the scope of the invention in any way. Exemplary ratios, materials and construction techniques are illustrative only and are not necessarily required to practice the invention. It is intended that the scope of the present invention herein disclosed should not be limited by the particular disclosed embodiments shown and described above, but should be defined only by a fair reading of the claims that follow.

Further modifications and alterations may occur to others upon reading and understanding the specification. It is intended to include all such modifications and alterations insofar as they come within the scope of the invention.

We claim:

1. A machine for terminating electric cable in which a length of cable is paid off a feeder in a feeding segment and then terminated at least at one end in a terminating segment characterized in that the feeding segment is decoupled from the terminating segment and the feeding segment comprises a plurality of feeders so that a length of cable is paid off of one feeder of the feeding segment while at least one end of another length of cable that has been paid off another feeder of the feeding segment is being terminated in the terminating segment, wherein the terminating segment consists of a single terminating segment that has at least one swing arm to process the at least one end of the length of cable.

2. A machine for terminating electric cable in which a length of cable is paid off a feeder in a feeding segment and then terminated at least at one end in a terminating segment characterized in that the feeding segment is decoupled from the terminating segment and the feeding segment comprises a plurality of feeders so that a length of cable is paid off of one feeder of the feeding segment while at least one end of another length of cable that has been paid off another feeder of the feeding segment is being terminated in the terminating segment, wherein the terminating segment consists of a single terminating segment that has a swing arm for terminating one end of a length of cable and a second swing arm for terminating an opposite end of another length of cable at the same time.

* * * * *